April 2, 1963 D. D. WILLARD 3,084,337
VARIABLE GAIN CONTROL
Filed Dec. 27, 1957
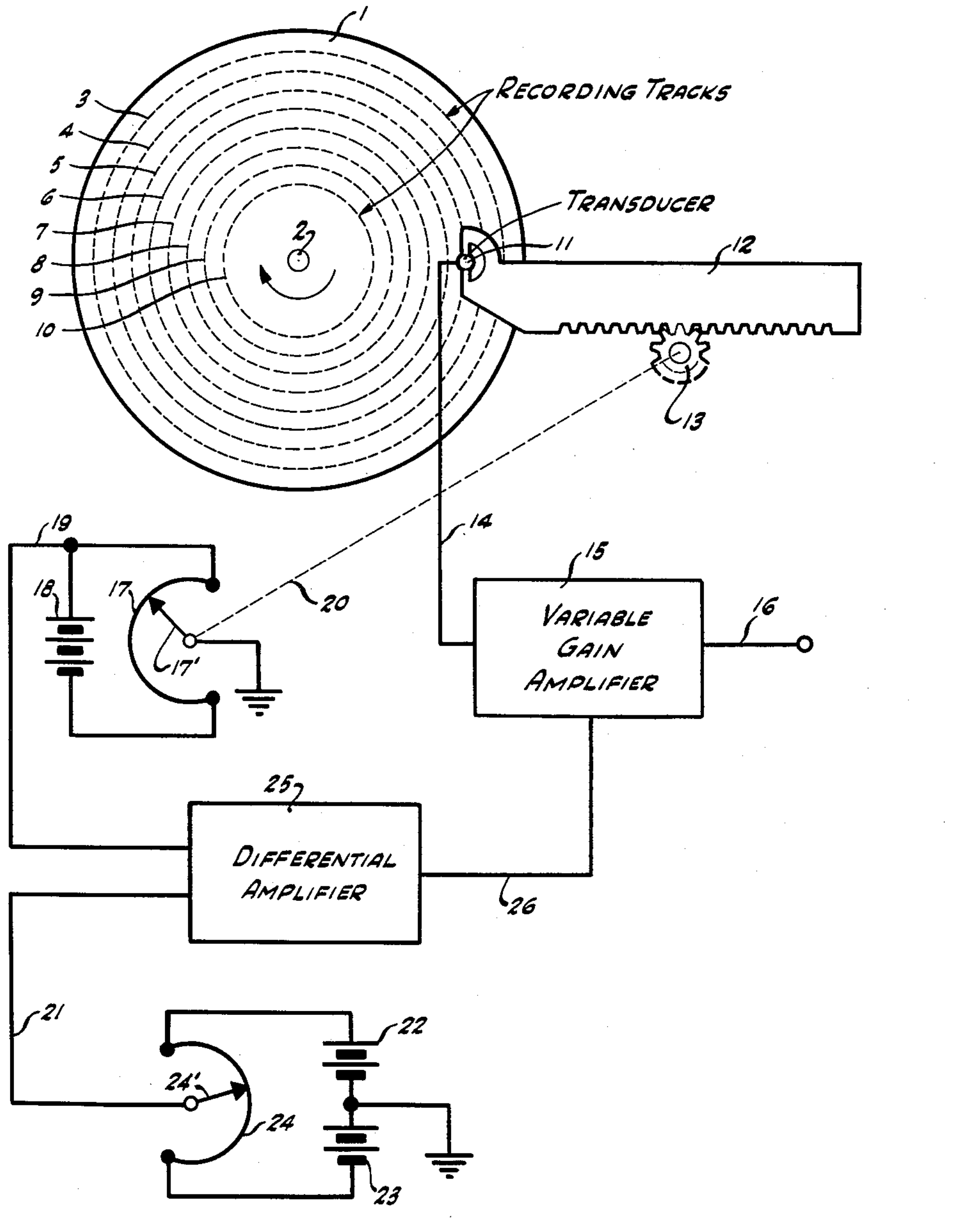
INVENTOR.
DENNIS D. WILLARD
BY Lippincott, Smith & Ralls
ATTORNEYS

United States Patent Office 3,084,337

Patented Apr. 2, 1963

3,084,337

VARIABLE GAIN CONTROL

Dennis D. Willard, San Jose, Calif., assignor to International Business Machines Corporation, New York, N.Y., a corporation of New York Filed Dec. 27, 1957, Ser. No. 705,671

2 Claims. (Cl. 340—174.1)

This invention relates to the reproduction of signals that have been recorded on magnetic discs and the like.

One type of data-storage apparatus used in accounting and computing machines, for example, utilizes as a storage medium a plurality of rotative magnetic-recording discs, on each of which signals may be recorded in a plurality of concentric, circular, recording tracks of different radii. In operation, a motor rotates the magnetic-recording discs, or records, at a fixed angular velocity, whereby the several recording tracks on each record move at linear velocities proportional to their respective radii. Thus, if the innermost recording track on each record has a radius only half as great as that of the outermost recording track, then the linear velocity of the innermost recording track is only half as great as that of the outermost recording track. By way of example, each side of each disc may carry 100 concentric recording tracks, all moving at different linear velocities proportional to their respective radii.

A particular set of stored data may be magnetically recorded in any selected one of the aforesaid recording tracks. A non-return-to-zero recording system is commonly used, wherein the presence or absence of reversals in the magnetic polarity of the recording track at successive "bit" locations represents the stored data. For reproducing the stored data, a reproducing head or transducer is positioned in alinement with the recording track wherein the desired data are stored, and as the recording track moves past the reproducing head, the transducer supplies an electric pulse at each reversal in the magnetic polarity of the recording track. In a random-access machine, means are provided for moving the same reproducing head into alinement with each recording track, selectively, so that the same head can reproduce data stored in any of the numerous recording tracks.

A difficulty arises from the facts that the several recording tracks on a disc move at different linear velocities, and the amplitude of the electric signals produced by the transducer is approximately proportional to the linear velocity of the recording track. Consequently, when the reproducing head is alined with the innermost recording track on a disc, the electric pulses supplied by the transducer responsive to reversals in magnetic polarity on the record have about one-half the amplitude that the pulses supplied by the transducer have when the reproducing head is alined with the outermost track of the same disc. Furthermore, the reproduction of recorded signals is always accompanied by a certain amount of electrical noise. Consequently, it is customary to amplify and clip the electric signals supplied by the transducer, with the clipping level appropriately set to eliminate the largest noise pulses while transmitting the smallest signal pulses.

Unless the magnetic recordings are of high quality, any fixed amplification-and-clipping level that will eliminate all noise peaks from the relatively large signals reproduced from the outermost recording track may fail to transmit the smallest data signals reproduced from the innermost recording track, while any fixed amplification-and-clipping level that will reliably transmit all of the data signals reproduced from the innermost recording track may permit the transmission of some noise peaks reproduced from the outermost recording track. Either eventuality may result in errors in the reproduced data. For the foregoing reasons it has heretofore been necessary to maintain a quite high quality in the magnetic recordings, which has resulted in a high rejection rate in the manufacture of the recording discs, and other disadvantages. An object of the present invention is to provide a simple and effective solution of the foregoing problems and difficulties.

According to this invention, signals supplied by the reproducing head or transducer are received and transmitted by a variable-gain amplifier, and automatic means are provided for increasing the gain of said amplifier in proportion to movement of the transducer radially inward with respect to said record, and decreasing the amplifier gain in proportion to outward movements of the transducer relative to the record. Thus, the amplifier has maximum gain when the reproducing head is alined with the relatively slow-moving innermost recording track, and has minimum gain when the reproducing head is alined with the relatively fast-moving outermost recording track. As a result, the reproduced signals at the output of the variable-gain amplifier have substantially the same amplitude, irrespective of the radius of the recording track in which the data is stored. The signals may then be clipped in a conventional manner to eliminate the noise.

The foregoing and other aspects of the invention may be better understood from the following illustrative description and the accompanying drawing. The scope of the invention is pointed out in the appended claims.

In the drawing, the single FIGURE is a schematic diagram illustrating an exemplary embodiment of the invention.

Referring to the drawing, a magnetic-recording disc or record 1 is mounted on a shaft 2 and is rotated at a fixed angular velocity by any suitable means, such as a conventional driving motor, not shown. Disc 1 is provided with a conventional magnetic-recording surface, whereby conventional magnetic-recording techniques can be utilized for the storage of data on the surface of the disc or record. For example, the non-return-to-zero method of magnetic recording may be employed, and different data may be stored in each of a plurality of concentric, circular recording tracks of different radii. In the drawing, the positions of eight such recording tracks are represented by eight broken-line circles 3 through 10. In actual practice, there may be as many such tracks as the size of the record will permit; a typical number is 100 concentric tracks on each side of a disc.

A reproducing head or transducer 11 is movable radially inward and outward relative to disc 1 by a positioning mechanism comprising a rack 12 and pinion 13. By rotating pinion 13, transducer 11 can be brought into alinement with any selected one of the recording tracks 3 through 10, for producing electric signals representing the data recorded in the selected track. Other means, not shown, may be employed, if desired, for moving the same transducer into alinement with tracks on other records.

Transducer 11 functions in a conventional and well-known manner to supply through lead 14 an electric pulse responsive to each change in magnetic polarity in the recording track alined with the transducer. The amplitude of the pulses so produced is approximately proportional to the linear velocity of the recording track. Therefore, with the radii of the recording track varying over approximately a 2:1 range between the outermost recording track 3 and the innermost recording track 10, the amplitude of the pulses supplied by transducer 11 varies over a 2:1 range as the transducer is moved between its outermost and innermost radial positions relative to disc 1. Electrical noise accompanying the desired electric pulses varies in amplitude over a like range; and consequently, with the raw signals supplied through lead 14 it is either difficult or impossible to establish a clipping level that will eliminate all of the noise peaks while reliably transmitting all of the desired signal pulses.

In accordance with this invention, the signals supplied through lead 14 by transducer 11 are received by a variable-gain amplifier 15 and transmitted thereby to an output lead 16. The gain of amplifier 15 is automatically adjusted, by means hereinafter more fully described, over a 2:1 range in proportion to the inward and outward movements of the transducer 11, so that signals reproduced from each recording track are supplied to lead 16 at substantially the same amplitude, irrespective of the track radius. Therefore, the signals at lead 16 can be transmitted through a conventional fixed-level clipping circuit, not shown, or the last stage of amplifier 15 can be designed to provide clipping action for separating the desired data pulses from unwanted noise.

The aforesaid automatic means comprises a potentiometer or voltage divider 17 connected across a floating voltage supply 18. The voltage divider 17 has an adjustable tap 17' that is connected to electrical ground or its circuit equivalent, so that a variable voltage is provided at lead 19 having values representative of the adjustment of voltage divider 17.

The broken line 20 represents any appropriate means for maintaining correspondence between the adjustment of voltage divider 17 and the radial position of transducer 11 relative to record 1. This may take the form of a simple mechanical linkage between pinion 13 and adjustable tap 17', or it may take the form of a servomechanism for automatically rotating pinion 13 responsive and in proportion to changes in the adjustment of voltage divider 17, or vice versa. By way of example, in one type of accounting machine wherein 100 concentric recording tracks of different radii are provided on each side of a recording disc, an addressing mechanism for selecting a desired track comprises 100 taps spaced along voltage divider 17, means for grounding each of the said taps, one at a time, selectively, for selecting the desired track, thereby providing a control voltage having any one, selectively, of 100 different values, and a servo system controlled by said voltage for rotating pinion 13 to position the transducer 11 in alinement with the selected recording track.

From the foregoing it is evident that the value of the voltage supplied at lead 19 is representative of the radial position of transducer 11 relative to record 1, and therefore it is representative of the linear velocity of the recording track alined with transducer 11. For calibration purposes, an adjustable voltage is supplied through lead 21 by any appropriate means, such as the positive voltage supply 22 and the negative supply voltage supply 23 connected in series across a potentiometer or voltage divider 24. Lead 21 is connected to the adjustable tap 24' of voltage divider 24 so that adjustment of the voltage divider adjusts the value of the voltage supplied through lead 21.

A differential amplifier 25 is jointly responsive to the two adjustable voltages provided through leads 19 and 21, respectively, for supplying through lead 26 an electric signal to control the gain of variable-gain amplifier 15. Numerous circuits and designs for variable-gain amplifiers and for differential amplifiers are well-known to those skilled in the art. Therefore, amplifiers 15 and 25 have not been illustrated in detail.

By way of example, however, the differential amplifier 25 may consist essentially of two vacuum tubes with their cathodes connected together and returned to the negative terminal of a power supply through a common cathode resistor, with the control grid of one tube connected to lead 21 and the control grid of the other tube coupled, preferably through a cathode follower, to lead 19 so that the relative currents conducted by the two tubes vary according to the voltage relation between leads 19 and 21. Lead 26 may be connected, preferably through a cathode follower, to the anode of either vacuum tube, depending upon whether an increase or a decrease in the signal through lead 26 is required as the voltage at lead 19 becomes more positive. This, of course, depends on the design of the variable-gain amplifier 15, and specifically upon whether amplifier 15 is grid-biased or cathode-biased.

As an example of the control effect, the amplifier 15 may be cathode-biased in any desired fashion and controlled as to its gain by supplying the output of the differential amplifier 25 as a voltage control by way of the lead 26. In this event, an increase in the signal through lead 26 decreases the gain of amplifier 15, which should occur when transducer 11 moves outward and the voltage at lead 19 becomes more positive, and therefore lead 26 is connected through a cathode follower to the anode of the tube having its control grid connected to lead 21.

It should be understood that this invention in its broader aspects is not limited to the specific exemplary embodiment herein illustrated and described. The following claims are intended to cover all changes and modifications within the true spirit and scope of the invention.

What is claimed is:

1. Apparatus for reproducing signals that have been recorded in a plurality of recording tracks of different radii upon a discoid record, comprising means for rotating said record at a fixed angular velocity, whereby said tracks move at different linear velocities proportional to their respective radii, a transducer for producing from such recording tracks electric signals having an amplitude approximately proportional to the linear velocity of the recording track, means for selectively moving said transducer radially inward and outward relative to said record and thus into alinement with said tracks selectively, a variable-gain amplifier connected to receive and to transmit said signals, an automatic means separate from said amplifier for producing a biasing voltage proportional to the inward and outward movements of said transducer relative to the periphery of said discoid record, and means for applying said biasing voltage to said amplifier for decreasing the amplifier gain in proportion to outward movements of the transducer toward the discoid record periphery and for increasing the gain of said amplifier in proportion to the inward movements of said transducer on said discoid record in a direction inwardly from the periphery, whereby the output signals of said amplifier are substantially the same amplitude independently of the linear velocity of movement of each of said recording tracks relative to the transducer.

2. Apparatus as defined in claim 1 wherein said automatic means comprises a first adjustable voltage-divider means for providing a first variable voltage, means for automatically maintaining correspondence between the adjustment of said first voltage-divider means and the radial position of said transducer relative to said record, whereby the value of said first voltage is representative of the linear velocity of the recording track in alinement with said transducer, a second adjustable voltage-divider means for providing a second variable voltage, and a differential amplifier jointly responsive to said first and second voltages for controlling the gain of said variable-gain amplifier.

References Cited in the file of this patent

UNITED STATES PATENTS

| | | |
|---|---|---|
| 2,239,042 | Kleber et al. | Apr. 22, 1941 |
| 2,320,429 | Hasbrouck | June 1, 1943 |
| 2,528,457 | Stone | Oct. 31, 1950 |
| 2,629,861 | Begun | Feb. 24, 1953 |
| 2,811,709 | Haselton | Oct. 29, 1957 |
| 2,807,797 | Shoemaker | Sept. 24, 1957 |
| 2,901,737 | Stovall | Aug. 25, 1959 |